(12) United States Patent
Glover et al.

(10) Patent No.: US 7,469,965 B2
(45) Date of Patent: Dec. 30, 2008

(54) HARNESS STRAP ADJUSTER

(75) Inventors: Richard Glover, Greenwood, IN (US); Jerry Bougher, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 288 days.

(21) Appl. No.: 11/277,724

(22) Filed: Mar. 28, 2006

(65) Prior Publication Data

US 2006/0214495 A1   Sep. 28, 2006

Related U.S. Application Data

(60) Provisional application No. 60/665,717, filed on Mar. 28, 2005.

(51) Int. Cl.
*A47D 1/10*   (2006.01)

(52) U.S. Cl. .................................... 297/250.1; 297/484
(58) Field of Classification Search .............. 297/250.1, 297/484
See application file for complete search history.

(56) References Cited

U.S. PATENT DOCUMENTS

| | | | |
|---|---|---|---|
| 6,592,183 B2 | 7/2003 | Kain | |
| 6,662,413 B2 | 12/2003 | Glover | |
| 6,698,841 B1 | 3/2004 | Glover et al. | |
| 7,350,862 B2 * | 4/2008 | Fransen et al. | ........ 297/250.1 X |

* cited by examiner

*Primary Examiner*—Anthony D Barfield
(74) *Attorney, Agent, or Firm*—Barnes & Thornburg LLP

(57) ABSTRACT

A juvenile seat includes a seat shell and a child-restraint harness coupled to the seat shell. A harness strap included in the child-restraint harness is coupled to a strap-length adjuster included in the juvenile seat and mounted on the seat shell.

17 Claims, 2 Drawing Sheets

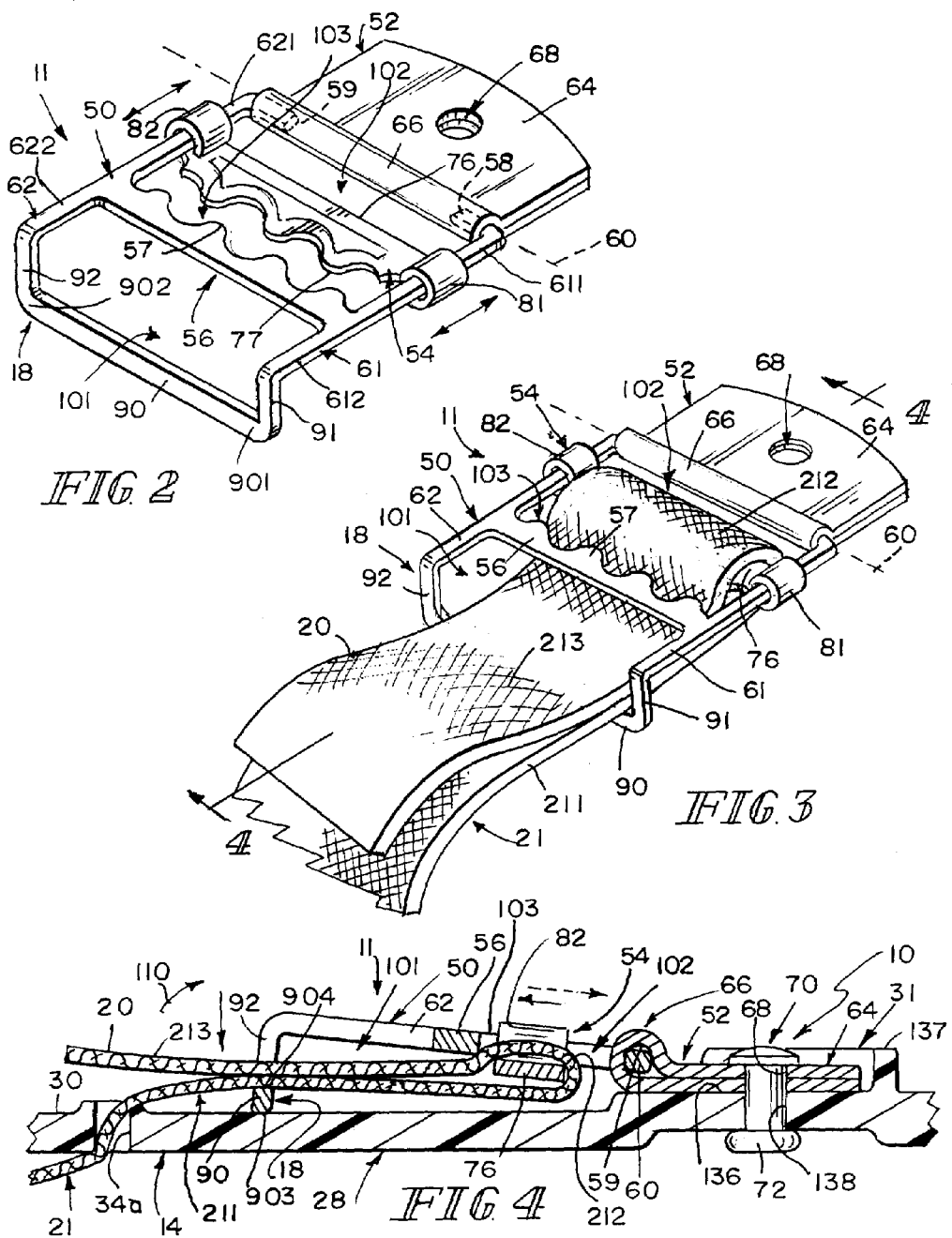

HARNESS STRAP ADJUSTER

This application claims priority under 35 U.S.C. § 119(e) to U.S. Provisional Application Ser. No. 60/665,717, filed Mar. 28, 2005, which is expressly incorporated by reference herein.

BACKGROUND

The present disclosure relates to an infant carrier, and particularly to a harness assembly for use in an infant carrier. More particularly, the present disclosure relates to harness strap adjusters included in infant carriers.

SUMMARY

According to the present disclosure, a strap-length adjuster is provided for gripping a harness strap included in an infant carrier harness system. The strap-length adjuster comprises a strap gripper including fixed and movable grip members, an anchor for mounting the strap gripper to pivot about an axis relative to a seat back included in an infant carrier, and a standoff coupled to the strap gripper and arranged to abut the seat back. In an illustrative embodiment, a harness strap is passed through openings formed in the strap-length adjuster and is arranged to trap a portion of the standoff against the seat back to block unwanted pivoting movement of the strap gripper about the pivot axis and thus block "microslip" of the harness strip in the strap-length adjuster.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is an enlarged perspective view of the first strap-length adjuster of FIG. 1 before the adjuster is coupled to the first strap;

FIG. 3 is a view of the first strap-length adjuster of FIG. 2 after the adjuster is coupled to the first strap; and FIG. 4 is an enlarged sectional view taken along line 4-4 of FIGS. 1 and 3.

DETAILED DESCRIPTION

Figure 1:
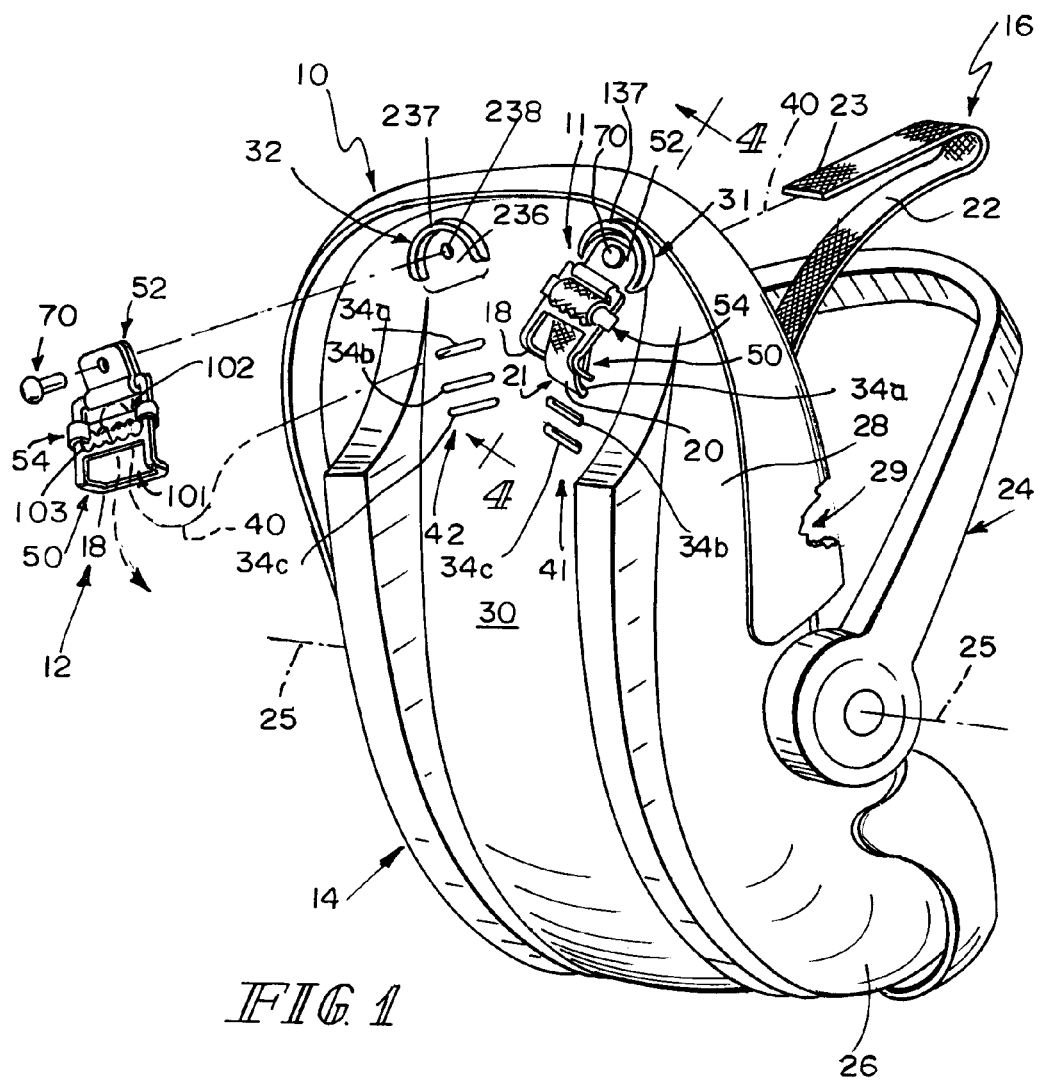
FIG. 1 is a perspective view of an infant carrier showing a carrying handle coupled to a seat shell and straps included in a harness system and showing a first strap coupled to a first strap-length adjuster mounted on the underside of the seat shell and a second strap arranged to be passed through a slot formed in the seat shell and mated with a second strap-length adjuster adapted to be mounted on the underside of the seat shell.

First and second strap-length adjusters 11, 12 are mounted on a seat shell 14 included in an infant carrier 10 and used to grip straps included in an infant-restraint harness system 16 associated with seat shell 14 and included in infant carrier 10 as suggested in FIGS. 1 and 4. Each adjuster 11, 12 receives one of harness straps 21, 22 provided in harness system 16 and includes a standoff 18 shown, for example, in FIGS. 2 and 3, that is arranged to extend between seat shell 14 and the harness strap 21 or 22 received by the adjuster 11 or 12 as suggested in FIGS. 1 and 4. The straps 21, 22 are "laced" to hold or maintain standoffs 18 in contact with or in close proximity to seat shell 14 to limit movement of adjusters 11, 12 relative to seat shell and thereby prevent "microslip" of harness straps 21, 22 relative to adjusters 11, 12 when those harness straps 21, 22 are "gripped" by adjusters 11, 12 as suggested in FIG. 4.

As suggested in FIG. 1, infant carrier 10 includes a seat shell 14, an infant-restraint harness system 16 associated with seat shell 14, and a carrying handle 24 pivotably coupled to seat shell 14 at pivot axis 25. Harness system 16 includes first and second child-restraint harness straps 21, 22. Seat shell 14 includes a seat bottom 26 and a seat back 28 that cooperates with seat bottom 26 to form an infant-receiving cavity 29 providing an infant or juvenile seat and containing portions of infant-restraint harness system 16.

As suggested in FIG. 1, a first adjuster mount site 31 is provided on a rearwardly facing surface 30 of seat back 28 and a second adjuster mount site 32 is provided on rearwardly facing surface 30 of seat back 28. First and second adjuster mount sites 31, 32 are positioned to lie in spaced-apart relation to one another near a top edge of seat back 28 as shown, for example, in FIG. 1. A first series 41 of strap-receiving slots 34a, 34b, 34c, is formed in seat back 28 and located in close proximity to first adjuster mount site 31. A second series 42 of strap-receiving slots 34a, 34b, 34c, is also formed in seat back 28 and located in close proximity to second adjuster mount site 32.

To vary the effective size of harness system 16 so as to adapt to larger or smaller infants (not shown), a caregiver can select one of the three matched pairs of slots 34a, 34b, 34c, associated with adjuster mount sites 31, 32 to receive harness straps 21, 22 and thus either increase or decrease the effective length of harness straps 21, 22 in the infant-receiving cavity provided in seat shell 14. The caregiver will select strap-receiving slots 34c, for smaller infants and strap-receiving slots 34a, for larger infants.

As suggested in FIG. 1, free end 20 of first strap 21 will be passed through slot 34a, of first series 41 and mated with first strap-length adjuster 11. Free end 23 of second strap 22 can be passed along dotted line 40 through slot 34a, of second series 42 and then mated with second strap-length adjuster 12. These actions will anchor harness straps 21, 22 to seat shell 14 and the presence of standoffs 18 in strap-length adjusters 11, 12 will act to prevent "microslip" or the harness straps 21, 22 gripped by adjusters 11, 12.

First adjuster mount site 31 comprises a first plate support 136 and a first curved fence 137 as suggested in FIGS. 1 and 4. First plate support 136 is provided on rearwardly facing surface 30 of seat back 28 and is formed to include a pin-receiving aperture 138. First curved fence 137 is coupled to rearwardly facing surface 30 of seat back 28 and arranged to extend around a portion of a perimeter edge of first plate support 136.

Second adjuster mount site 32 comprises a second plate support 236 and a second curved fence 237 as suggested in FIG. 1. Second plate support 236 is provided on rearwardly facing surface 30 of seat back 28 and is formed to include a pin-receiving aperture 238 Second curved fence 237 is coupled to rearwardly facing surface 30 of seat back 28 and arranged to extend around a portion of the perimeter edge of second plate support 236.

First strap-length adjuster 11 includes a strap receiver frame 50, a frame anchor 52 coupled to frame 50 and adapted to be coupled to first plate support 136, a strap retainer slide 54 mounted for movement on frame 50, and standoff 18 coupled to frame 50 as shown, for example, in FIG. 2. Second strap-length adjuster 12 has the same construction as first strap-length adjuster 11 in an illustrative embodiment shown, for example, in FIG. 1.

In the illustrated embodiment, strap receiver frame 50 is somewhat H-shaped and includes first and second rails 61, 62, a fixed grip member 56 interconnecting rails 61, 62, a first pivot arm 58 coupled to first rail 61, and a second pivot arm 59 coupled to second rail 62 as suggested in FIG. 2. First and second rails 61, 62 are coupled to standoff 18 and are arranged to lie in spaced-apart parallel relation to one another. Fixed grip member 56 extends laterally and orthogonally between first and second rails 61, 62 and lie between standoff 18 and the movable strap retainer slide 54. Fixed grip member 56 is formed to include a series of rounded strap-gripping teeth 57 facing toward strap retainer slide 54. First and second pivot arms 58, 59 are arranged to extend toward one another along pivot axis 60 as suggested in FIG. 2.

Frame anchor 52 includes a mount plate 64 and a pivot arm support 66 coupled to mount plate 64 as illustrated in FIG. 2. Mount plate 64 is formed to include a pin-receiving aperture 68. Pivot arm support 66 is formed to include passageway means for receiving each of first and second pivot arms 58, 59 as suggested in FIG. 2 to establish a pivotable connection between frame 50 and frame anchor 52 at pivot axis 60. It is within the scope of this disclosure to use any suitable means to support frame 50 for pivotable or other movement relative to frame anchor 52 to facilitate lacing a harness strap through openings provided in strap receiver frame 50 and between fixed grip member 56 and strap retainer slide 54.

Mount plate 64 of first strap-length adjuster 11 is placed on first plate support 136 of first adjuster mount site 31 to align pin-receiving aperture 68 with pin-receiving aperture 138 as suggested in FIG. 4. A fastener pin 70 is passed through the aligned pin-receiving apertures 68, 138 and retained therein using any suitable means such as retainer 72 to fix frame anchor 52 in a fixed position on first plate support 136 as suggested in FIG. 4. Once frame anchor 52 is fixed as described and illustrated at first adjuster mount site 31, frame 50 and standoff 18 coupled to frame 50 are free to pivot relative to seat back 28 and frame anchor 50 about pivot axis 60 so as to facilitate lacing first harness strap 21 through openings provided in strap receiver frame and between fixed grip member 56 and strap retainer slide 54.

Strap retainer slide 54 includes first and second rail sleeves 81, 82 and a movable grip member 76 arranged to interconnect rail sleeves 81, 82 as shown, for example, in FIGS. 2 and 3. First rail sleeve 81 is mounted for back-and-forth sliding movement on rear section 611 included in first rail 61 and located between fixed grip member 56 and first pivot arm 58. Likewise, second rail sleeve 82 is mounted for back-and-forth sliding movement on rear section 621 included in second rail 62 and located between fixed grip member 56 and second pivot arm 59. Movable grip member 76 is formed to include a series of rounded strap-gripping teeth 77 facing toward the series of rounded strap-gripping teeth 57 included in fixed grip member 56 as shown best in FIG. 2.

Standoff 18 includes first and second risers 91, 92 and, in an illustrative embodiment, a lateral base 90 as shown, for example, in FIGS. 2-4. In the illustrated embodiment, standoff 18 is U-shaped and arranged to elevate strap receiver frame 50 somewhat above rearwardly facing surface 30 of seat back 28 as suggested in FIG. 4. Standoff 18 is arranged to limit movement of strap receiver frame 50 toward seat back 28 and to separate strap gripper frame 50 from seat back 28.

In the illustrated embodiment, as suggested in FIGS. 2-4, an upper end of first riser 91 is coupled to a free end of first rail 61. Similarly, an upper end of second riser 92 is coupled to a free end of second rail 62. A lower end of first riser 91 is arranged to abut seat back 28 and coupled to one end 901 of lateral base 90. A lower end of second riser 92 is arranged to abut seat back 28 and coupled to another end 902 of lateral base 90. As a result, lateral base 90 interconnects lower ends of first and second risers 91, 92 as shown best in FIG. 2. Lateral base 90 also includes a downwardly facing surface 903 that is arranged to contact rearwardly facing surface 30 of seat back 28 and an upwardly facing surface 904 that is arranged to face away from rearwardly facing surface 30.

First and second risers 91, 92 are arranged to lie in spaced-apart substantially parallel relation to one another in an illustrative embodiment shown, for example, in FIGS. 2 and 3. First riser 91 is arranged to lie in substantially perpendicular relation to first rail 61. Second riser 92 is arranged to lie in substantially perpendicular relation to second rail 62. First and second risers 91, 92 are arranged to lie in substantially perpendicular relation to lateral base 90.

First harness strap 21 is laced through three openings formed in first strap-length adjuster 11 as suggested in FIGS. 2-4 so as to cause first harness strap 21 to be gripped by adjuster 11 in non-slip relation to seat back 28. Fixed grip member 56, a forward section 612 of first rail 61, first riser 91, lateral base 90, second riser 92, and a forward section 622 of second rail 62 cooperate to define a first opening 101 as shown in FIG. 2. Movable grip member 76, a variable portion of rearward section 611 of first rail 61, pivot arm support 66, and a variable portion of rearward section 621 of second rail 62 cooperate to define a second opening 102. Movable grip member 76, another variable portion of rearward section 611 of first rail 61, fixed grip member 56, and another variable portion of rearward section 621 of second rail 62 cooperate to define a third opening 103.

As suggested in FIGS. 3 and 4, free end 20 of first harness strap 21 is passed, in sequence, through strap-receiving slot 34a, formed in seat back 28 and then through first opening 101, second opening 102, third opening 103, and then back through first opening 10. Proximal portion 211 and distal portion 213 of first harness strap 21 passes through first opening 101 as shown, for example, in FIGS. 3 and 4. A bight portion 212 of first harness strap 21 interconnects proximal and distal portions 211, 213 and passes through the second and third openings 102, 103 as shown, for example, in FIGS. 3 and 4. This activity causes first harness strap 21 to mate with first strap-length adjuster 11. Second harness strap 22 is mated with second strap-length adjuster 12 in a similar manner as suggested in FIG. 1.

As illustrated in FIG. 4, first harness strap 21 contacts upwardly facing surface 904 of lateral base 90 of standoff 18. Such contact functions to block pivoting movement of strap receiver frame 50 about pivot axis 60 in clockwise direction 110.

The invention claimed is:

1. A juvenile seat comprising a seat shell including a seat bottom and a seat back cooperating with the seat bottom to form a child-receiving cavity on a front side of the seat shell, the seat back being formed to include a first strap-receiving slot having a front opening on the front side of the seat shell and a rear opening on a back side of the seat shell, a child-restraint harness coupled to the seat shell and arranged to lie in the child-receiving cavity to restrain a child seated therein, the child-restraint harness including a first harness strap arranged to pass through the first strap-receiving slot to locate a free end of the first harness strap outside of the infant-receiving cavity and along the back side of the seat shell, and a strap-length adjuster coupled to the seat back and arranged to lie along the back side of the seat shell in close proximity to the rear opening of the first strap-receiving slot, the strap-length adjuster including an anchor coupled to the seat back, a strap gripper formed to include strap receiver openings receiving the free end of the first harness strap therein and mounted to the anchor for pivotable movement about a pivot axis toward and away from the seat back in a location between the anchor and the rear opening of the first strap-receiving slot, and a standoff coupled to the strap gripper and arranged to abut the seat back to limit movement of the strap gripper toward the seat back wherein the standoff is U-shaped and includes a first riser coupled to the strap gripper, a second riser coupled to the strap gripper, and a lateral base arranged to abut the seat back and interconnect the first and second risers.

2. The juvenile seat of claim 1, wherein the strap gripper includes a first rail coupled to the first riser, a second rail coupled to the second riser, a fixed grip member arranged to interconnect the first and second rails and cooperate with the standoff to form a first of the strap receiver openings therebetween, and a strap retainer slide mounted for movement relative to the fixed grip member to form a second of the strap receiver openings between the anchor and the strap retainer slide and a third of the strap receiver openings between the fixed grip member and the strap retainer slide and wherein the free end of the first harness strap includes proximal and distal portions passing through the first of the strap receiver openings to lie in spaced-apart relation to the seat back to locate the lateral base of the standoff therebetween and a bight portion interconnecting the proximal and distal portions and passing through the second and third of the strap receiver openings.

3. The juvenile seat of claim 2, wherein the anchor includes a mount plate fixed to the seat back and a pivot arm support coupled to the mount plate and formed to include first and second arm receivers, the first rail of the strap gripper is formed to include a first pivot arm arranged to extend along the pivot axis into the first arm receiver and a rear section extending between the fixed grip member and the first pivot arm, the second rail of the strap gripper is formed to include a second pivot arm arranged to extend along the pivot axis into the second arm receiver and a rear section extending between the fixed grip member and the second pivot arm, and the strap retainer slide includes a first rail sleeve mounted for back-and-forth sliding movement on the rear section of the first rail, a second rail sleeve mounted for back-and-forth sliding movement on the rear section of the second rail, and a movable grip member interconnecting the first and second rail sleeves and lying in confronting relation to the pivot support arm to define the second of the strap-receiver openings therebetween and to the fixed grip member to define the third of the strap-receiving openings therebetween.

4. The juvenile seat of claim 2, wherein the first and second risers are arranged to lie in spaced-apart substantially parallel relation to one another, the first rail is arranged to lie in substantially perpendicular relation to the first riser and to the fixed grip member, and the second rail is arranged to lie in substantially perpendicular relation to the second riser and to the fixed grip member.

5. The juvenile seat of claim 1, wherein the first and second risers are arranged to lie in spaced-apart substantially parallel relation to one another and in substantially perpendicular relation to the lateral base.

6. A juvenile seat comprising a seat shell including a seat bottom and a seat back cooperating with the seat bottom to form a child-receiving cavity on a front side of the seat shell, the seat back being formed to include a first strap-receiving slot having a front opening on the front side of the seat shell and a rear opening on a back side of the seat shell, a child-restraint harness coupled to the seat shell and arranged to lie in the child-receiving cavity to restrain a child seated therein, the child-restraint harness including a first harness strap arranged to pass through the first strap-receiving slot to locate a free end of the first harness strap outside of the infant-receiving cavity and along the back side of the seat shell, and a strap-length adjuster coupled to the seat back and arranged to lie along the back side of the seat shell in close proximity to the rear opening of the first strap-receiving slot, the strap-length adjuster including an anchor coupled to the seat back, a strap gripper formed to include strap receiver openings receiving the free end of the first harness strap therein and mounted to the anchor for pivotable movement about a pivot axis toward and away from the seat back in a location between the anchor and the rear opening of the first strap-receiving slot, and a standoff coupled to the strap gripper and arranged to abut the seat back to limit movement of the strap gripper toward the seat back wherein the back side of the seat shell includes a first adjuster mount site on the seat back, the first adjuster mount side includes a first plate support provided on the seat back and formed to include a pin-receiving aperture and a first fence coupled to the seat back and arranged to extend away from the seat back and around a portion of a perimeter edge of the first support plate, and the anchor includes a mount plate arranged to abut the first plate support and formed to include a pin-receiving aperture formed in the first plate support and a fastener pin arranged to extend through the pin-receiving apertures formed in the mount plate and the first plate support to retain the mount plate in a fixed position on the first plate support in a region defined by the first fence.

7. A juvenile seat comprising a seat shell including a seat bottom and a seat back cooperating with the seat bottom to form a child-receiving cavity on a front side of the seat shell, the seat back being formed to include a first strap-receiving slot having a front opening on the front side of the seat shell and a rear opening on a back side of the seat shell, a child-restraint harness coupled to the seat shell and arranged to lie in the child-receiving cavity to restrain a child seated therein, the child-restraint harness including a first harness strap arranged to pass through the first strap-receiving slot to locate a free end of the first harness strap outside of the infant-receiving cavity and along the back side of the seat shell, and a strap-length adjuster coupled to the seat back and arranged to lie along the back side of the seat shell in close proximity to the rear opening of the first strap-receiving slot, the strap-length adjuster including an anchor coupled to the seat back, a strap gripper formed to include strap receiver openings receiving the free end of the first harness strap therein and mounted to the anchor for pivotable movement about a pivot axis toward and away from the seat back in a location between the anchor and the rear opening of the first strap-receiving slot, and a standoff coupled to the strap gripper and arranged to abut the seat back to limit movement of the strap gripper toward the seat back wherein the standoff includes a first riser coupled to the strap gripper and arranged to abut the seat back to separate the strap gripper from the seat back wherein the standoff further includes a second riser coupled to the strap gripper and arranged to abut the seat back to separate the strap gripper from the seat back.

8. The juvenile seat of claim 7, wherein the second riser is arranged to lie in laterally spaced-apart relation to the first riser.

9. A juvenile seat comprising a seat shell including a seat bottom and a seat back cooperating with the seat bottom to form a child-receiving cavity on a front side of the seat shell, the seat back being formed to include a first strap-receiving slot having a front opening on the front side of the seat shell and a rear opening on a back side of the seat shell, a child-restraint harness coupled to the seat shell and arranged to lie in the child-receiving cavity to restrain a child seated therein, the child-restraint harness including a first harness strap arranged to pass through the first strap-receiving slot to locate a free end of the first harness strap outside of the infant-receiving cavity and along the back side of the seat shell, and a strap-length adjuster coupled to the seat back and arranged to lie along the back side of the seat shell in close proximity to the rear opening of the first strap-receiving slot, the strap-length adjuster including an anchor coupled to the seat back, a strap gripper formed to include strap receiver openings receiving the free end of the first harness strap therein and mounted to the anchor for pivotable movement about a pivot axis toward and away from the seat back in a location between the anchor and the rear opening of the first strap-receiving slot, and a standoff coupled to the strap gripper and arranged to abut the seat back to limit movement of the strap gripper toward the seat back wherein the standoff includes a first riser coupled to the strap gripper and arranged to abut the seat back to separate the strap gripper from the seat back wherein the strap gripper includes a first rail coupled to the first riser, a second rail coupled to the second riser, a fixed grip member arranged to interconnect the first and second rails and cooperate with the first and second risers to form a first of the strap receiver openings therebetween, and a strap retainer slide mounted for movement relative to the fixed grip member to form a second of the strap receiver openings between the anchor and the strap retainer slide and a third of the strap receiver openings between the fixed grip member and the strap retainer slide.

10. The juvenile seat of claim 9, wherein the free end of the first harness strap includes proximal and distal portions passing through the first of the strap receiver openings and a bight portion interconnecting the proximal and distal portions and passing through the second and third of the strap receiver openings.

11. The juvenile seat of claim 9, wherein the anchor includes a mount plate fixed to the seat back and a pivot arm support coupled to the mount plate and formed to include first and second arm receivers, the first rail of the strap gripper is formed to include a first pivot arm arranged to extend along the pivot axis into the first arm receiver and a rear section extending between the fixed grip member and the first pivot arm, the second rail of the strap gripper is formed to include a second pivot arm arranged to extend along the pivot axis into the second arm receiver and a rear section extending between the fixed grip member and the second pivot arm, and the strap retainer slide includes a first rail sleeve mounted for back-and-forth sliding movement on the rear section of the first rail, a second rail sleeve mounted for back-and-forth sliding movement on the rear section of the second rail, and a movable grip member interconnecting the first and second rail sleeves and lying in confronting relation to the pivot support arm to define the second of the strap-receiver openings therebetween and to the fixed grip member to define the third of the strap-receiving openings therebetween.

12. A juvenile seat comprising a seat shell including a seat bottom and a seat back cooperating with the seat bottom to form a child-receiving cavity on a front side of the seat shell, the seat back being formed to include a first strap-receiving slot having a front opening on the front side of the seat shell and a rear opening on a back side of the seat shell, a child-restraint harness coupled to the seat shell and arranged to lie in the child-receiving cavity to restrain a child seated therein, the child-restraint harness including a first harness strap arranged to pass through the first strap-receiving slot to locate a free end of the first harness strap outside of the infant-receiving cavity and along the back side of the seat shell, and a strap-length adjuster coupled to the seat back and arranged to lie along the back side of the seat shell in close proximity to the rear opening of the first strap-receiving slot, the strap-length adjuster including an anchor coupled to the seat back, a strap gripper formed to include strap receiver openings receiving the free end of the first harness strap therein and mounted to the anchor for pivotable movement about a pivot axis toward and away from the seat back in a location between the anchor and the rear opening of the first strap-receiving slot, and a standoff coupled to the strap gripper and arranged to abut the seat back to limit movement of the strap gripper toward the seat back wherein the first and second risers are arranged to lie in spaced-apart substantially parallel relation to one another, the first rail is arranged to lie in substantially perpendicular relation to the first riser and to the fixed grip member, and the second rail is arranged to lie in substantially perpendicular relation to the second riser and to the fixed grip member.

13. A juvenile seat comprising a seat shell including a seat bottom and a seat back cooperating with the seat bottom to form a child-receiving cavity on a front side of the seat shell, the seat back being formed to include a first strap-receiving slot having a front opening on the front side of the seat shell and a rear opening on a back side of the seat shell, a child-restraint harness coupled to the seat shell and arranged to lie in the child-receiving cavity to restrain a child seated therein, the child-restraint harness including a first harness strap arranged to pass through the first strap-receiving slot to locate a free end of the first harness strap outside of the infant-receiving cavity and along the back side of the seat shell, and a strap-length adjuster coupled to the seat back and arranged to lie along the back side of the seat shell in close proximity to the rear opening of the first strap-receiving slot, the strap-length adjuster including a frame anchor coupled to the seat back, an H-shaped strap receiver frame having a first end mounted on the frame anchor for pivotable movement about a pivot axis and an opposite second end, and a standoff coupled to the opposite second end and arranged to abut the seat back normally to orient the H-shaped frame at an acute angle relative to the seat back.

14. The juvenile seat of claim 13, wherein the H-shaped strap receiver frame includes first and second rails, a fixed grip member interconnecting the first and second rails, a first pivot arm coupled to one end of the first rail and arranged to mate with the frame anchor along the pivot axis at the first end of the H-shaped strap receiver frame, a second pivot arm coupled to one end of the second rail and arranged to mate with the frame anchor along the pivot axis at the first end of the H-shaped strap, and the standoff is coupled to the first and second rails.

15. The juvenile seat of claim 14, wherein the first rail includes a second end opposite to the first end thereof, the second rail includes a second end opposite to the first end thereof, and the standoff is coupled to the second ends of the first and second rails.

16. The juvenile seat of claim 14, wherein the standoff is U-shaped and includes a first riser coupled to the strap gripper, a second riser coupled to the strap gripper, and a lateral base arranged to abut the seat back and interconnect the first and second risers.

17. The juvenile seat of claim 14, wherein the standoff includes a first riser coupled to the first rail and arranged to abut the seat back to separate the H-shaped strap receiver frame from the seat back and a second riser coupled to the second rail and arranged to abut the seat back to separate the H-shaped strap receiver frame from the seat back.

* * * * *